Patented July 7, 1936

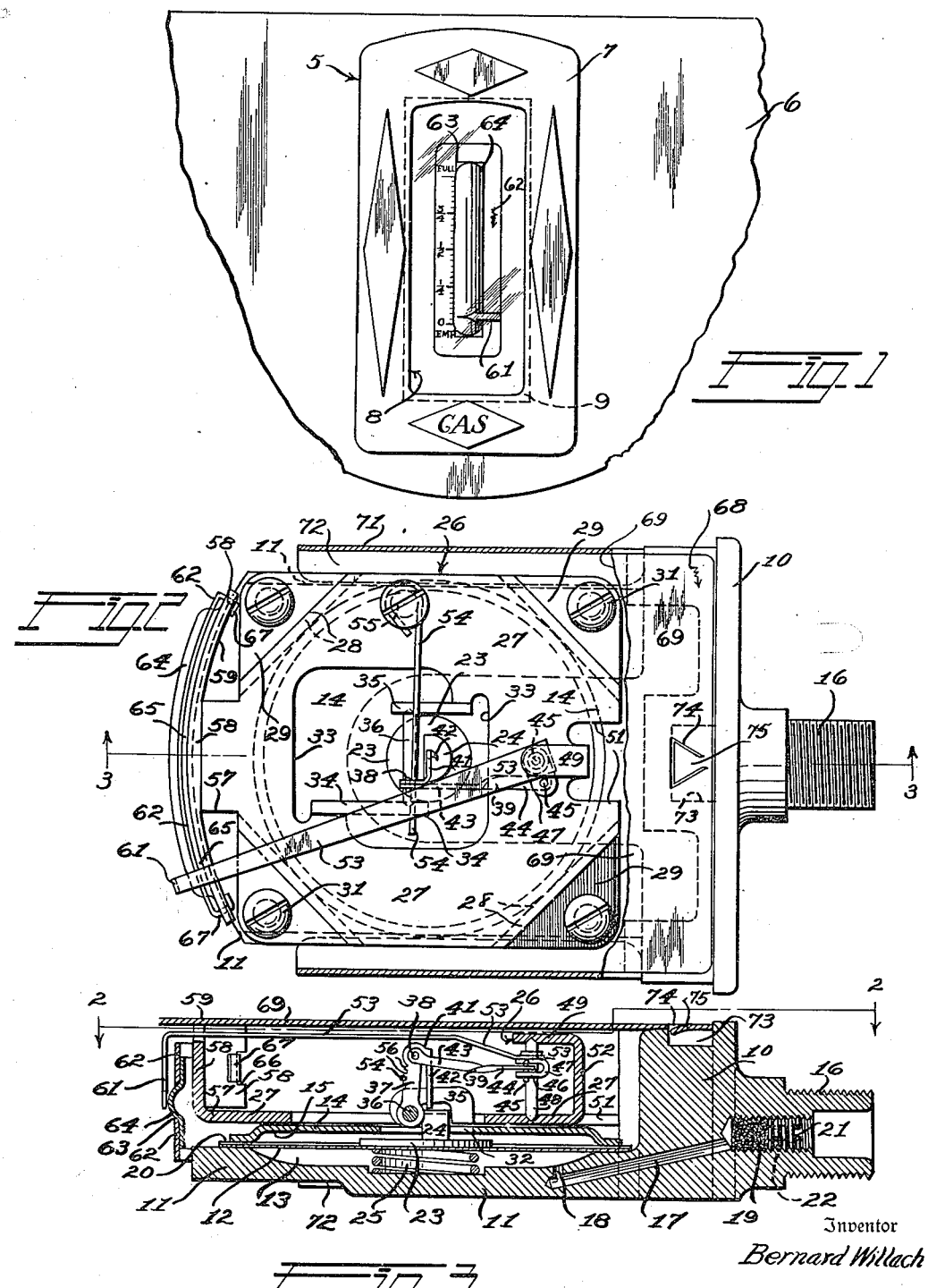

2,046,539

UNITED STATES PATENT OFFICE 2,046,539

LOW PRESSURE GAUGE OF THE DIAPHRAGM TYPE

Bernard Willach, Sellersville, Pa., assignor to United States Gauge Company, New York, N. Y., a corporation of Pennsylvania Application March 25, 1930, Serial No. 438,832

11 Claims. (Cl. 73—110)

The present invention relates to diaphragm gauges, particularly those of the low pressure type.

More specifically, this invention relates to low pressure gauges designed especially for indicating at a distance the variations in the depth of a liquid, the total variations in depth of which may be relatively small, thus requiring a sensitive gauge in order to record the fluctuations accurately. In this respect my invention is related to that disclosed in a similar pending application, Serial Number 354,823, filed April 13, 1929. In said application there is shown a diaphragm and movement of great accuracy and sensitivity without, however, any auxiliary means for permitting precise and convenient adjustment of the movement for selectively adapting it for use in connection with various liquids and liquids of various maximum depths, or for rendering it perfectly accurate when it is set up in a particular working combination.

Accordingly, it is one of the principle objects of the present invention to provide a gauge movement which shall be adjustable to readily and conveniently adapt the gauge for accurate indication in any combination in which such gauges are designed for use.

Gauges constructed in accordance with the present invention are specially adapted for use in connection with automobiles for indicating the depth of gasoline in the tank, the depth of water in the radiator, the depth of oil in the crankcase, or height of electrolite in the storage battery, for example. It should be understood, however, that the gauge may be used in any similar situation. When gauges of this character are employed on automobiles or the like for the purposes specified they are so located as to be under the observation of the driver. The latter, his undivided attention being required for careful operation of the vehicle, can give the gauges but a fleeting glance and hence the visible or indicating portions of the gauges must be of such character that they provide unmistakable and readily discernible readings.

Still further, when gauges of this character are disposed so as to be under the observation of the driver, the usual and most convenient positions for them are upon the vehicle dashboard. Due to the improvements and refinements in present-day automobiles, there is such a great number of instruments, controls, lights and adjustments mounted upon the dashboard that the space upon the visible surface of, and behind, the dashboard is limited. Hence, in order to mount all of the essential instruments upon the dashboard, such instruments must be of extremely compact design.

In accordance with the need and demand for improvements of the character specified in the preceding paragraphs, further major objects of the present invention are to provide a gauge which shall be relatively small in size and so compact in design as to require a minimum amount of mounting space, and to so design and arrange a gauge that its visible or indicating portion shall provide unmistakable and readily discernible readings. In furtherance of these major objects other specific or subordinate objects may be enumerated, as follows:

It is an object of this invention to provide, in a level-indicating device of the character described, a vertically movable horizontal pointer cooperating with a vertically disposed dial or the like to move between high and low points on said dial to indicate high and low liquid levels respectively.

Another object is to provide a diaphragm gauge wherein the diaphragm is capable of exerting a thrust in a direction parallel to the pivotal axis of a vertically swinging pointer.

A further object is to so design a diaphragm gauge that the diaphragm axial thrust is in a line or plane substantially parallel to an arcuate path in which an indicating pointer is adapted to swing.

Still another object lies in the provision of a diaphragm gauge having an indicator consisting of a swinging arm and an offset pointer, so assembled that the diaphragm thrust is in a direction normal to the plane of the swinging movement of said arm.

With these objects in view, as well as others that will appear in the following detailed disclosure, reference will be had to the accompanying drawing forming part of same and in which:

Figure 1 shows, in front elevation, a preferred form of the gauge of this invention mounted in a portion of an automobile dashboard as it appears from the driver's seat.

Figure 2 is an enlarged side view, partly in section and partly in elevation with the front closure plate removed and the device separated from the dashboard, showing the internal structural details as they appear when viewed substantially upon the plane indicated by line 2—2, Figure 3.

Figure 3 constitutes a longitudinal sectional view of the device of Figure 2, with the indicator swung to its intermediate position for convenience in illustration, taken substantially along the somewhat irregular line 3—3, Figure 2.

Referring now to the drawing by reference numerals with like numerals designating like parts, in Figure 1 there is shown the gauge of this invention, indicated in general assembly by numeral 5 mounted in a panel such as the dash or instrument board 6 of an automobile. The surface illustrated is that which falls within the convenient observation of the driver of the vehicle. A front end closure plate or cap 7 is mounted flush against the board surface, and has a vertical rectangular opening 8 beneath which it supports a transparent glass 9. Behind the glass, and visible therethrough, is the mechanism of the gauge proper, which mechanism will be described later in connection with Figures 2 and 3.

Turning now to Figures 2 and 3, there is shown a main body casting comprising an upright base or block 10 having integrally formed therewith and normal thereto a thin, flat, substantially rectangular plate 11. This plate is designed to support the diaphragm structure and the movement of the gauge. Plate 11 also forms part of the diaphragm structure, being shaped on its interior surface to cooperate with a diaphragm 12 to form a dish-shaped expansible chamber 13. The diaphragm, preferably a sheet of fine silk treated with varnish, has its edges pressed against the plate 11 in sealing engagement therewith by an annular washer 20 and a substantially rectangular plate 14, the latter being stamped to provide a dish-shaped surface 15 in opposing relationship with that of plate 11.

The block 10 is provided with a nipple 16 which is adapted for connection with a line (not shown) containing air or fluid under a pressure proportionate to the amount or depth of liquid in a container, such as the gasoline tank, for example. A passage 17 is drilled from the interior of this nipple, through block 10 and plate 11, and it connects with a second drilled passage 18 through which communication is established with the diaphragm chamber 13. A quantity of material 19, such as felt, is disposed within the nipple to prevent any harmful effects upon the gauge that might otherwise result from sudden or abnormal fluctuations of pressure in the connecting line. A plug 21 is screwed into the bore of the nipple to compress the felt, this plug having a through passageway 22 so as not to entirely disrupt communication between the pressure line and the diaphragm chamber.

A thin disc 23 of light material is cemented or glued upon one surface of the diaphragm centrally thereof, and carries an integral, substantially semi-cylindrical actuating lug 24 for cooperation with the movement (not yet described) of the gauge. A light coil spring 25 reacts against the diaphragm on its surface opposite the disc 23, said spring being disposed within the pressure chamber 13 and supported by the plate 11.

The purpose of this spring is to almost counterbalance the tendency of the pointer to swing downwardly under the influence of gravity and of a second spring later to be described. In this manner the pointer is steadied and the instrument rendered sensitive to very small pressure changes.

A stamped movement-supporting framework 26 is disposed within the angle between the block 10 and the plate 11. This framework includes a substantially flat and rectangular plate 27 parallel to plate 11 and having its four corners bent toward the plate 11, as indicated by the full and broken lines 28 in Figure 2. In this manner the corners provide tabs 29 which are offset into a plane parallel to that of plate 27, and which thereby engage the four corresponding corners of the plate 14 to space the plate 27 from plate 11 sufficiently to allow for the dished formation of plate 14. Machine screws 31 pass through the tabs 29, plate 14, washer 20, diaphragm 12 and thence into the cast plate 11 to firmly secure all of these enumerated elements in assembled relationship.

The plate 14 which provides a stop for disc 23 and prevents rupture of the diaphragm when abnormal pressures are applied thereto, has a central hole 32 through which the lug 24 may project, and reciprocate as the diaphragm flexes in response to varying pressures in chamber 13. Likewise, in frame plate 27, an opening 33 is provided for the lug 24, as well as for structural convenience. The opening 33 is relatively large and, in forming the same, a pair of elongated horizontal bearing elements 34 and 35 are formed from plate 27 by certain cutting and bending operations. These elements are in parallelism and provide bearings for the ends of a vertical spindle 36. A straight rocker arm 37 is secured at one end to said spindle to project radially and horizontally therefrom. At its opposite end the rocker arm is freely pivoted, as at 38, to one end of a link 39. At its same (opposite and pivoted) end, arm 37 has an integral J-shaped actuating portion 41, the leg 42 of which projects horizontally into contact with the diaphragm-actuated lug 24, whereby the latter is adapted to push horizontally against the leg 42 to cause the rocker arm to oscillate in a counter-clockwise direction (in Figure 3), which oscillation in turn pulls the link 39 toward the left.

The link 39 comprises a horizontal flat portion 43 and a vertical flat portion 44, twisted with respect to portion 43. The end of the vertical portion is freely pivoted, as at 45, within the clevis-shaped end 46 of a crank 47 that has its opposite end secured to a spindle 48 for oscillation therewith. Spindle 48 is horizontally disposed with one end rotatably borne by the plate 27 and its opposite end rotatably supported by a bearing element 49. Element 49 forms an integral part of the framework 26 having been formed by cutting openings 51 in the plate 27 and thereafter bending a strip 52 of material laterally into a right angle normal to said plate. An indicator arm 53 is secured to the spindle 48 and adapted to swing vertically in response to oscillation of said spindle.

A wire spring 54 has one end thereof secured to the plate 27 by a screw 55 in such manner that its opposite end resiliently engages the left side of rocker arm 37 and tends to rock it toward the right in clockwise direction in opposition to the diaphragm pressure. This spring is sufficiently strong to cause the diaphragm and the gauge movement to move toward zero position upon decrease of pressure in diaphragm chamber 13. It will thus be seen that increase of pressure causes the diaphragm lug 24, through the above described mechanism, to raise the free end of the indicator arm, and that the said arm aided by spring 54, swings downwardly as the pressures fall. The engagement of the wire spring 54 with the arm 37 is by way of one of a plurality of notches 56 cut in the arm. Any one of these notches may be selected at will in order to vary the effective arm length between the wire and the axis of spindle 36. This adjustment of course varies the effective resistance that the spring sets up against the diaphragm pressures, with the result that the particular instrument may readily be adapted for the measurement of any one of a plurality of liquid levels. In addition, the indicating mechanism (about to be described) may be accurately adjusted to maintain reliable readings in the particular set-up in which the gauge is already incorporated.

At its front (left) end the frame plate 27 has an integral extension 57 which carries at right angles thereto an upright segmental strip 58 of substantially cylindrical curvature. One edge of this strip is partially cut away as at 59 to permit the indicator arm 53 to extend therethrough and swing up and down. The indicator arm terminates in a pointer 61, bent at right angles thereto and adapted to swing vertically, always in horizontal position, past the strip 58 in spaced relation from said strip. Between the pointer and the strip a dial or indicating assembly is mounted for cooperation with the pointer, as follows:

A rectangular strip 62 of flexible material is centrally and longitudinally slotted as at 63 to receive and provide a frame for an elongated protuberance 64 formed on a cylindrically curved segment 65. (See also Figure 1.) This assembly is fitted against the outer surface of the frame segment 58, the ends of which are provided with slots 66 through which locking tabs 67 carried by strip 62 are projected and bent to hold the dial assembly in position. The elongated vertical protuberance 64 preferably is colored, as may be also the pointer 61, in such manner that the contrast in color permits the pointer position relative to the protuberance to be correctly observed at a glance. To provide great accuracy in the readings the strip 62 may have a vertical scale marked thereon adjacent the protuberance and normal to the tip of the pointer, as illustrated in Figure 1. Since the pointer is always horizontal and is itself "high" when the liquid level is "high" and "low" when the liquid level is "low", and since the dial assembly is narrow and vertical, the optical effect upon an observer is substantially the same as is obtained when looking at a liquid gauge glass or directly at a cross section of the fluid in the tank to which the gauge is connected. Hence the vehicle driver may, with a safe and fleeting glance and a minimum of mental effort, secure a reliable and unmistakable indication of a particular liquid level.

The angle, between the casting block 10 and its integral plate 11, is closed by a quickly detachable casing member 68 that is adapted to telescopingly slide over the front (left) end of the device until it abuts the irregularly shaped casting block 10. It comprises a flat cover 69 having side walls 71 extending normal to, and in the same direction from, its side edges, the side walls 71 in turn having their free edges bent to form slips 72 that hook behind the cast plate 11. A recess 73 is provided in the side of block 10, and the end of cover 69 is slotted as at 74 to form a snap-latch 75. This latch is bent inwardly so that, as the casing is telescoped into place, it snaps into the recess and engages a wall of the latter to yieldably retain the casing in locked position. As hitherto stated, the gauge is inserted through the dashboard, as in Figure 1, with the closure cap 7 cooperating with the casing to complete the assembly and lend to it a finished and attractive appearance.

The described apparatus may be made in various sizes, but remains of neat appearance and extremely compact design. For the low pressure work discussed above, it has been manufactured in vest-pocket size of substantially the same size and shape, when completely assembled, as a package of cigarettes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a liquid level indicating instrument, a horizontal colored indicating element mounted for substantially vertical up and down movement; a narrow elongated dial vertically disposed behind said horizontal indicating element; and mechanism for actuating said element to move it up and down over said dial; said dial comprising an elongated strip solidly colored to contrast with said indicating element and to simulate the appearance of a column of liquid.

2. In the indicating instrument defined in claim 1, said actuating mechanism being disposed behind, and substantially wholly between the vertical planes bounding the sides of, said narrow vertical dial and said colored strip being of convex protuberant shape.

3. In an indicating instrument, a framework; a narrow elongated dial assembly supported by said framework; an indicator mounted within said framework and provided with a pointer, movable from one narrow end to said dial assembly toward the other and always disposed in a position substantially perpendicular to the longitudinal center line of said elongated dial assembly; and mechanism mounted within said framework for actuating said indicator; said dial assembly including a narrow segment having an elongated slot therein, and an elongated strip comprising a colored protuberance fitted within said slot behind said pointer for cooperation with the latter to render unmistakable indications of the positions of said actuating mechanism.

4. A compactly designed diaphragm gauge, comprising a thin and substantially flat diaphragm structure, including a pressure-responsive diaphragm arranged to exert a thrust in a direction normal to said thin flat structure; mechanism mounted upon said structure and operatively associated with said diaphragm for actuation thereby; a dial face assembled adjacent said mechanism at one edge of said thin flat structure; and an indicator connected to said mechanism for actuation thereby and for cooperation with said dial face to register pressure variations; said indicator comprising an arm pivoted on an axis that is substantially parallel to the direction of diaphragm thrust, and a pointer offset from said arm into proximity with said dial face.

5. In the diaphragm gauge defined in claim 4, said dial face being upright and confined to the width of said one edge of the flat structure, and said indicator being pivoted on a horizontal axis for vertical swinging movement.

6. A compactly designed diaphragm gauge, comprising a thin and substantially flat diaphragm structure, including a pressure-responsive diaphragm arranged to exert a thrust in a direction normal to said thin flat structure; mechanism mounted upon said structure and operatively associated with said diaphragm for actuation thereby; a dial face assembled adjacent said mechanism at one edge of said flat structure; a fluid passage opening into the opposite edge of said structure to transmit pressure to the diaphragm; and an indicator connected to said mechanism for actuation thereby and for cooperation with said dial face to register pressure variations; said indicator comprising a pointer which moves in a path that is substantially parallel to the direction of axial diaphragm thrust.

7. In the combination defined in claim 6, said dial face being narrow and vertically disposed, and said indicator being so designed that said pointer moves over said dial face in horizontal position.

8. In a recording gauge, the combination of a plate having a rib thereon, and a second plate superposed upon said first plate, said second plate having a color contrasting with that of said first plate, and a slot through which said rib extends, said slot being of such size that substantially only said rib is visible therethrough.

9. In a recording gauge, the combination of a plate having a rib thereon, a second plate superposed upon said first plate, said second plate having a color contrasting with that of said first plate and a slot through which said rib extends, and a pointer having a portion extending in front of said rib and having a color in the region adjacent said rib contrasting with the color thereof.

10. In combination, a liquid level indicating instrument comprising a thin, substantially rectangular body for projecting through an opening in a dashboard or the like with one of its thin faces arranged in upright position and positionable substantially flush with the visible side of said dashboard, a vertically elongated dial forming part of said upright thin face, a horizontal pointer designed to move up and down over said vertical dial, and mechanism disposed within said body and connected with said pointer for actuating the latter in response to variations in liquid levels; said mechanism including a single pressure responsive diaphragm assembly arranged adjacent and substantially covering one of the vertical sides of the rectangular body with its axis of thrust horizontal and parallel to the dashboard surface, and means for transmitting thrust from said diaphragm assembly to said pointer, said means being wholly located in direct laterally offset relation to said diaphragm assembly.

11. In a pressure responsive instrument comprising a thin wafer-like body having a plurality of thin faces or edges and a side wall of relatively large area, an elongated dial provided at one of said thin faces, a thin diaphragm assembly mounted within the body on said side wall; said assembly comprising a flexible diaphragm fitted to and substantially covering said wall, and a plate secured to said wall to position the diaphragm with respect to the latter, said plate having laterally offset members; a pointer designed to move past said elongated dial in a direction longitudinally thereof; and mechanism carried by said offset members within the confines of said body and designed to actuate said pointer in response to movement of said diaphragm.

BERNARD WILLACH.

CERTIFICATE OF CORRECTION.

Patent No. 2,046,539. July 7, 1936.

BERNARD WILLACH.

It is hereby certified that error appears in the printed specification of the above numbered patent requiring correction as follows: Page 3, second column, line 40, claim 3, for "to" read of; and that the said Letters Patent should be read with this correction therein that the same may conform to the record of the case in the Patent Office.

Signed and sealed this 8th day of September, A. D. 1936.

(Seal)

Leslie Frazer
Acting Commissioner of Patents.